(12) United States Patent
Bodeker et al.

(10) Patent No.: US 8,950,277 B2
(45) Date of Patent: Feb. 10, 2015

(54) TENSION GAUGE APPARATUS AND SYSTEMS AND METHODS FOR MEASURING BELT TENSION

(71) Applicant: FedEx Ground, Inc., Collierville, TN (US)

(72) Inventors: Daniel Bodeker, Lino Lakes, MN (US); James A. Grund, Hudson, WI (US)

(73) Assignee: FedEx Ground, Inc., Collierville, TN (US)

( * ) Notice: Subject to any disclaimer, the term of this patent is extended or adjusted under 35 U.S.C. 154(b) by 77 days.

(21) Appl. No.: 13/898,729

(22) Filed: May 21, 2013

(65) Prior Publication Data

US 2014/0345393 A1 Nov. 27, 2014

(51) Int. Cl.
| | |
|---|---|
| *G01L 1/04* | (2006.01) |
| *G01L 1/00* | (2006.01) |
| *G01L 5/00* | (2006.01) |
| *G01L 1/26* | (2006.01) |
| *G01L 5/04* | (2006.01) |
| *G01L 5/06* | (2006.01) |

(52) U.S. Cl.
CPC ........................................ *G01L 5/06* (2013.01)
USPC ............. 73/862.453; 73/862.451; 73/862.381

(58) Field of Classification Search
USPC ........ 73/862.453, 862.451, 862.391, 862.381
See application file for complete search history.

(56) References Cited

U.S. PATENT DOCUMENTS

| | | | |
|---|---|---|---|
| 6,722,212 B2 * | 4/2004 | Specht | 73/862.381 |
| 6,732,592 B1 * | 5/2004 | Blackburn et al. | 73/826 |
| 7,242,286 B2 * | 7/2007 | Knox | 340/457.1 |
| 7,357,419 B2 * | 4/2008 | Kock et al. | 280/801.1 |
| 7,752,925 B2 * | 7/2010 | Koors et al. | 73/862.391 |
| 7,806,007 B2 * | 10/2010 | Murphy et al. | 73/862.391 |

* cited by examiner

*Primary Examiner* — Lisa Caputo
*Assistant Examiner* — Jamel Williams
(74) *Attorney, Agent, or Firm* — Withers & Keys, LLC

(57) ABSTRACT

A return container for a sensor device and methods of forming a sensor device return container are disclosed. Generally, the apparatus may include a deflecting blade, a handle, and an indicator. The deflecting blade has a shaft and planar portion extending from respective ends. The planar portion can be placed proximate a working surface associated with a conveyor bearing and movable to provide the tension force on the belt. The handle is connected to the shaft and provides a torque when the handle is moved about an axis of the shaft. As an initial torque is applied to the shaft, the planar portion applies a first force against the working surface. The indicator is on the handle and measures the tension force on the belt when the handle provides a sufficiently increased torque such that the planar portion minimally deflects the working surface to a predetermined position.

29 Claims, 9 Drawing Sheets

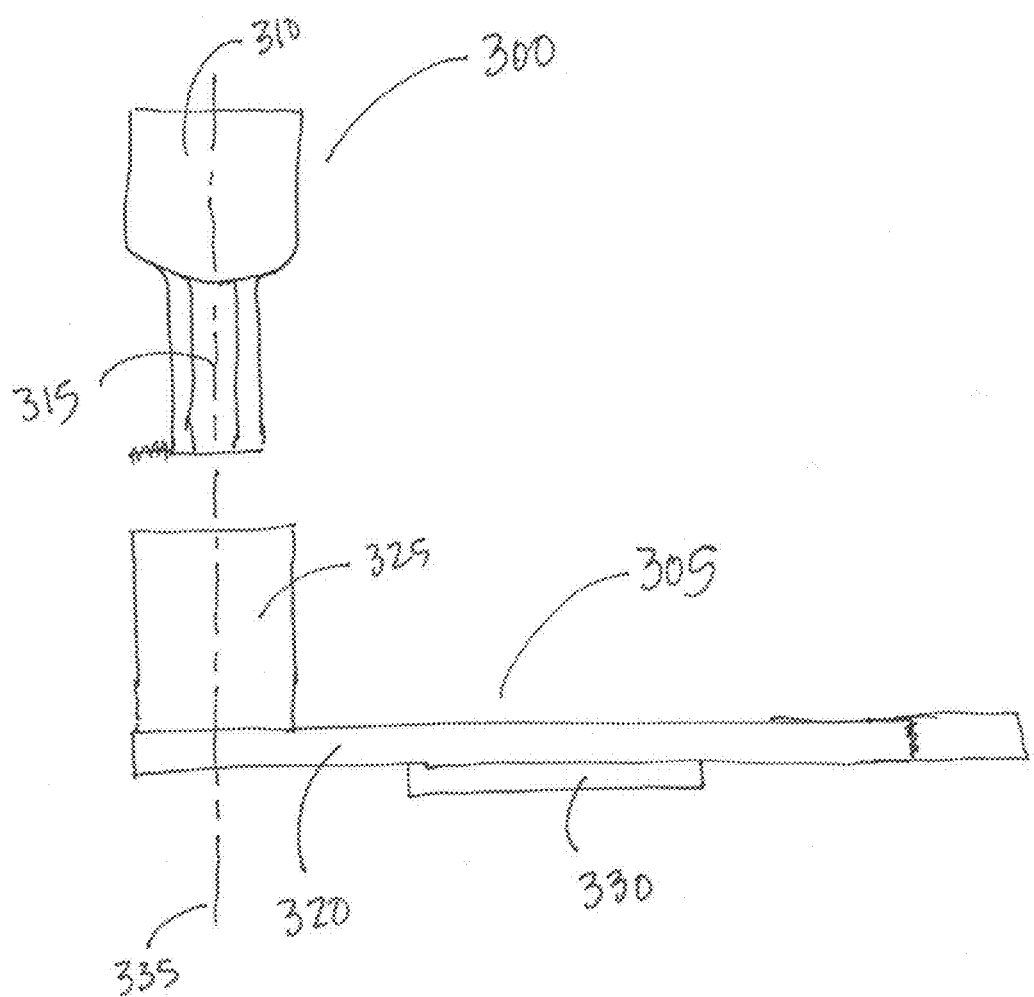

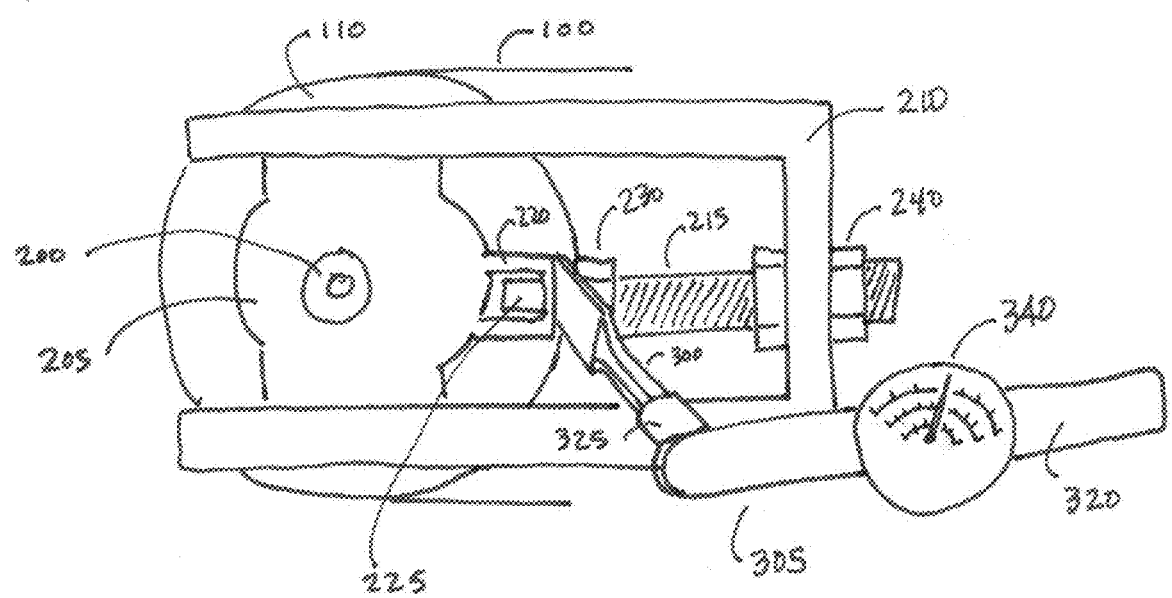

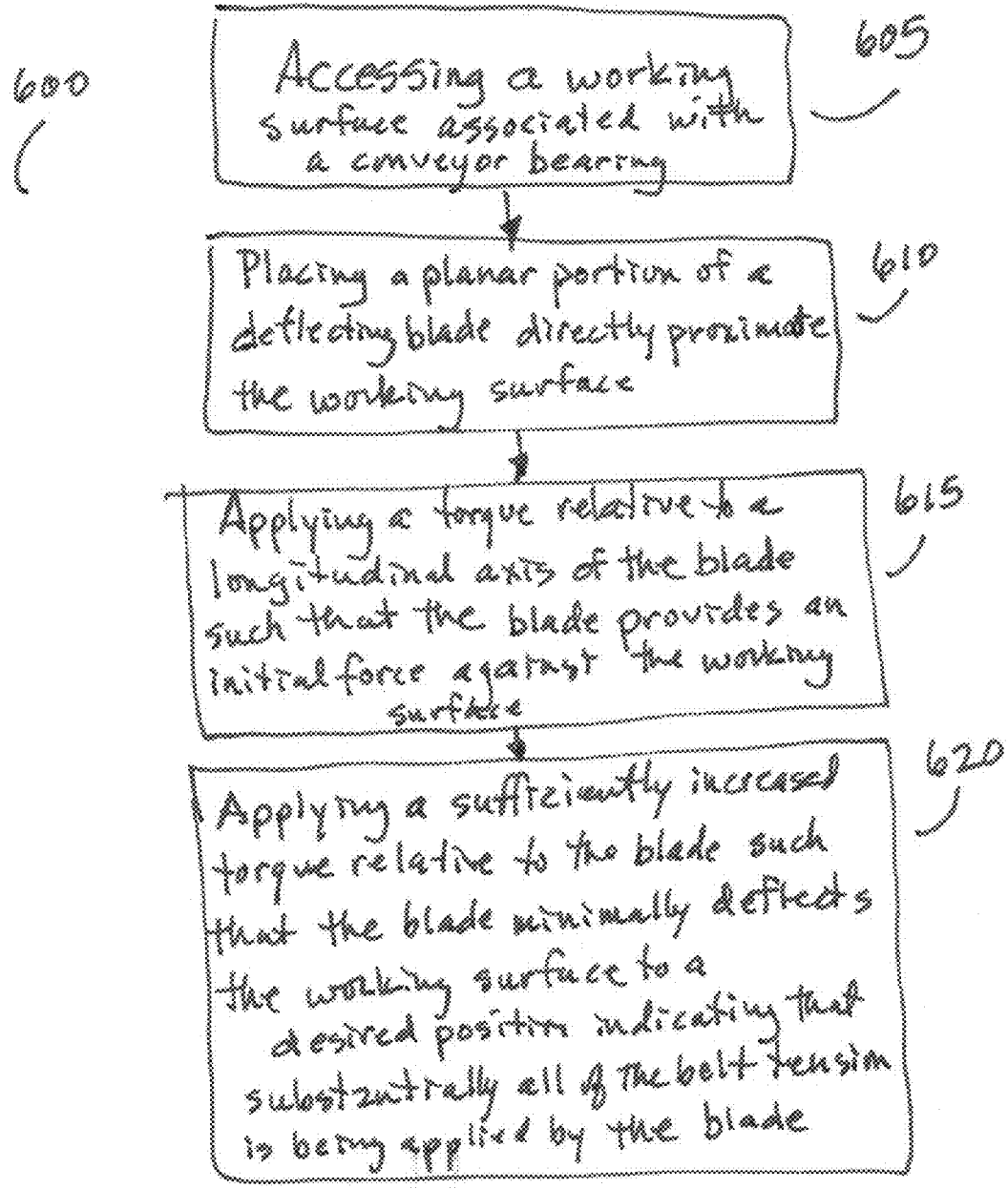

605 Accessing a working surface associated with a conveyor bearing

610 Placing a planar portion of a deflecting blade directly proximate the working surface 615 Applying a torque relative to a longitudinal axis of the blade such that the blade provides an initial force against the working surface 620 Applying a sufficiently increased torque relative to the blade such that the blade minimally deflects the working surface to a desired position indicating that substantially all of the bolt tension is being applied by the blade

TENSION GAUGE APPARATUS AND SYSTEMS AND METHODS FOR MEASURING BELT TENSION

FIELD OF THE DISCLOSURE

The present disclosure relates to systems, apparatus, and methods in the field of tension measurements and, more particularly, for a tension gauge apparatus for measuring belt tension for a conveyor belt.

BACKGROUND

Conveyor systems are commonly used to move product or materials from one location to another. Conveyor belt systems accomplish this by typically using a moving belt or a conveyor type belt to power live roller conveyors. A conventional conveyor belt system may have two or more pulleys and the moving, continuous belt that rotates around the pulleys. The belt is usually driven by some type of powered pulley or other mechanism that urges the belt around the pulleys. The system may be a simple one belt system, or may be a more complex system having multiple conveyor belt sections, where each section is configured to have a particular belt and move product or materials from one section to another.

Conveyor belts used in such systems have a characteristic service life, which may depend upon many factors. Those skilled in the art will appreciate that these factors may include, but are not limited to, the type and quality of the belt and splice joining the ends of the belt, the weight and shape of the belt, the bends in the conveyor system, pulley lagging, tension, etc.

For proper system operation and to best take advantage of the belt's possible service life, it is important to maintain an appropriate level of belt tension on a belt within a conveyor. Conventional conveyor systems are known to use a take-up pulley or bearing, which may be selectively moved relative to other pulleys in the system in order to maintain a relatively constant and desired level of belt tension.

Belt manufacturers typically recommend a range for anticipated belt stretching as part of an initial tensioning guideline, but accurately measuring belt tension as it is initially installed or at any time during its life can be problematic. A belt usually stretches over time, especially during an initial break-in use period. Belt stretching or expansion necessarily reduces belt tension, which can lead to various undesirable problems with a conveyor system. For example, one skilled in the art will appreciate that improper belt tension may result in problems such as belt reversion (i.e., softening and deterioration of the belt material), imbalance of belt wear, slippage under load, higher energy consumption for the system, heat losses, belt failure, drive failures, premature bearing wear, drive pulley shaft deflection, seized conveyors, and the like. Things that may affect belt tension and belt stretch include the type of belt, the material and uniformity of the belt, the width and length of the belt, product weight on the belt to be conveyed, drive roller surface, belt arc on the drive pulley/roller contact, and the like.

Conventional methods for tensioning belts are known to be imprecise, overly cumbersome, or may require an undesired level of support resources. One conventional rule of thumb for determining a proper belt tension is to stop the conveyor and depress the belt near a crowned pulley to see if there is any visible play between the pulley and the belt. In other words, if the belt tension is not high enough to force the belt to conform to the crown on a crowned pulley, poor tracking will likely result and an increase in belt tension is warranted. However, this method is imprecise at best and difficult to repeat with respect to different operators or the same operator attempting to set the same tension at different times.

Another classic belt tensioning procedure involves making two marks on the top side of the belt under zero tension, and then increasing the tension to the belt until it stretches to the manufacturer's recommended percentage of stretch. As such, the belt may be initially over-tensioned to account for a typical belt stretch range (e.g., 0.3% to 2.0% belt stretch). However, this method is often vague and imprecise in that it may not take into account a variety of different conveyor configurations and applications.

Another way to measure belt tension is to precisely model the conveyor and account for all factors that impact tension. However, this is known to be computationally difficult, multifaceted in the different types of factors involved, and cumbersome for service personnel. For example, belt manufacturers may attempt to estimate belt tension when supplied with additional information relative to a belt installation, such as loading and pulley configuration information. Calculation tools may attempt to model some of the variables that affect the tracking and tensioning of a conveyor belt, but this is computationally intensive and will change very quickly over time and with any change in the system requiring an undesirably high-level of engineering support and cost to determine belt tension.

As a result, conveyor system operators may over tension the belts because of a lack of an easy way to accurately measure belt tension. Thus, there remains a need for an apparatus and system that allows for an easier and quicker way to measure belt tension within a conveyor system.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a tension gauge apparatus for measuring belt tension on a bearing providing a tension force on a belt. The tension gauge apparatus generally includes a deflecting blade, a handle, and an indicator on the handle. The deflecting blade has a shaft extending from a first end of the blade and a planar portion extending from the opposite end of the blade. The planar portion of the blade is configured to be placed proximate to a working surface associated with the bearing. The working surface is movable to provide the tension force on the belt. The handle is connected to the shaft and is configured to provide a torque relative to a longitudinal axis of the shaft when the handle is moved about the longitudinal axis of the shaft. As such, as an initial torque is applied to the shaft, the planar portion applies a first force against the working surface. The indicator on the handle is configured to measure the tension force on the belt when the handle provides a sufficiently increased torque such that the planar portion minimally deflects the working surface to a predetermined position.

In another aspect of the disclosure, another tension gauge apparatus is disclosed. The tension gauge apparatus generally includes a deflecting blade, a handle, and an indicator. The deflecting blade generally comprises a planar portion configured to be placed between a fixed surface and a working surface of a conveyor bearing providing a tension force on a conveyor belt. The deflecting blade also includes a shaft disposed in a fixed relationship relative to the planar portion of the blade. The handle is connected to the shaft and configured to provide a torque relative to an axis of the shaft when the handle is moved about the axis of the shaft. As such, when an initial torque is applied to the shaft, the planar portion applies a first force against the working surface. The indicator is coupled to the handle and configured to measure the tension force on the conveyor belt when the handle provides a sufficiently increased torque such that the planar portion minimally deflects the working surface to a desired position indicative of substantially all of the tension force being applied to the planar portion.

In another aspect of the disclosure, a system for measuring conveyor belt tension is disclosed. The system generally includes a conveyor system having multiple conveyor belt sections, where each of the conveyor belt sections includes a conveyor belt. The system also includes multiple conveyor bearings respectively coupled to each of the conveyor belt sections, where each of the conveyor bearings have a fixed surface and a working surface, and each of the conveyor bearings provides a tension force on the conveyor belt in the respective section. The system also includes a deflecting blade, a handle, and an indicator as described above where the handle provides a sufficiently increased torque such that the blade minimally deflects the working surface to a desired position indicative of substantially all of the tension force being applied to the belt for one of the conveyor belt sections.

In yet another aspect of the disclosure, a method is described for measuring belt tension on a conveyor belt. The method begins by accessing a working surface of a conveyor bearing. Next, the method places a planar portion of a deflecting blade directly proximate the working surface. The method continues by applying a torque relative to a longitudinal axis of the deflecting blade such that the deflecting blade provides an initial force against the working surface. Finally, the method applies a sufficiently increased torque relative to the longitudinal axis of the deflecting blade such that the blade minimally deflects the working surface to a desired position indicative of substantially all of the belt tension on the conveyor belt being applied by the deflecting blade.

In yet another aspect of the disclosure, a system for measuring conveyor belt tension is described. The system comprises a frame, a bearing housing movably mounted within the frame, and a conveyor bearing rotationally mounted within the bearing housing. The conveyor bearing provides a tension force on a conveyor belt. The system further comprises an integrated tension measuring device, actuator, and a controller. The integrated tension measuring device is disposed between the frame and the bearing housing. The integrated tension measuring device provides a reading on an output where the reading is associated with the tension force provided by the conveyor bearing. The actuator is disposed between the integrated tension measuring device disposed between the frame and the bearing housing, and provides an adjustable linear force on the conveyor bearing through the bearing housing. The controller is coupled to the integrated tension measuring device and the actuator, and is operatively configured to perform various steps. These steps include storing an initial measure of the tension force based upon an initial reading from the integrated tension measuring device and identifying a change in the tension force on the conveyor belt based upon a subsequent reading from the integrated tension measuring device. If the subsequent reading is greater than a predetermined threshold, the controller is operative to issue a notification indicating the subsequent reading exceeded the predetermined threshold, and then alter the adjustable linear force on the conveyor bearing by sending an adjustment signal to the actuator, which causes the actuator to move relative to the bearing housing. The controller may further be operative to compare the subsequent reading to a history of readings associated with one or more other conveyor bearings, or alter the adjustable linear force on the conveyor bearing in response to an alternative configuration signal sent to the actuator.

In yet another aspect of the disclosure, another system for measuring conveyor belt tension is disclosed. The system comprises a set of frame rails, a bearing housing, a conveyor bearing, a pivoting linkage, a tensioning member, and an indicator. The bearing housing is movably mounted on the set of frame rails while the conveyor bearing is rotationally mounted within the bearing housing so that the conveyor bearing may provide a tension force on a conveyor belt. The pivoting linkage has a first end and a second end, and a pivot point disposed substantially near the first end. The pivot point is stationary with respect to the set of frame rails and is in a responsive configuration with the bearing housing to cause the bearing housing to move on the set of rails when the pivoting linkage is pivoted about the pivot point. The tensioning member is disposed substantially near the other end of the pivoting linkage such that the tensioning member provides a torque on the pivoting linkage associated with a compression force on the tensioning member. The indicator is disposed substantially near the another end of the pivoting linkage, and configured to identify the tension force on the conveyor belt when the tensioning member provides a sufficiently increased torque to the pivoting linkage at the another end of the pivoting linkage. The indicator may include one or more scales.

Additional advantages of this and other aspects of the disclosed embodiments and examples will be set forth in part in the description which follows, and in part will be obvious from the description, or may be learned by practice of disclosed embodiments of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

FIGS. 3A-3B are diagrams illustrating different views and features of an exemplary tension gauge apparatus in accordance with an embodiment of the invention;

FIG. 4A is a diagram illustrating the exemplary tension gauge apparatus of FIGS. 3A-3B disposed proximate to an exemplary bearing in accordance with an embodiment of the invention;

FIG. 6 is a flowchart diagram illustrating exemplary steps of a method for measuring belt tension on a conveyor belt in accordance with an embodiment of the invention.

DESCRIPTION OF THE EMBODIMENTS

Figure 1:
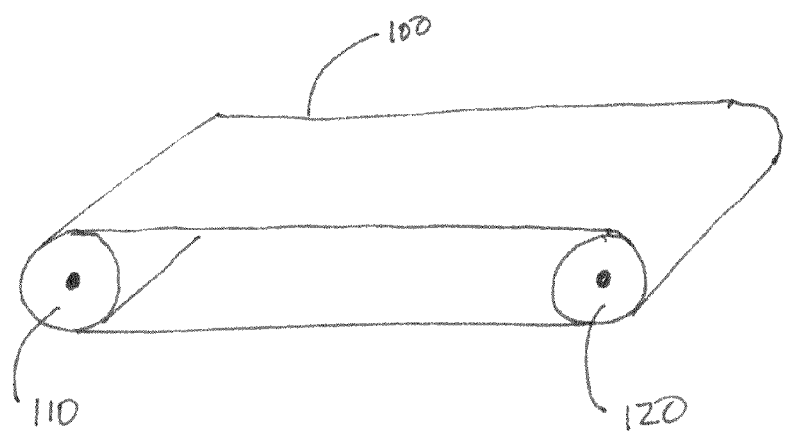
FIG. 1 is a perspective view of an exemplary conveyor for use with an embodiment of the invention.

Reference will now be made in detail to exemplary embodiments. Wherever possible, the same reference numbers are used in the drawings and the description to refer to the same or like parts.

Figure 2:
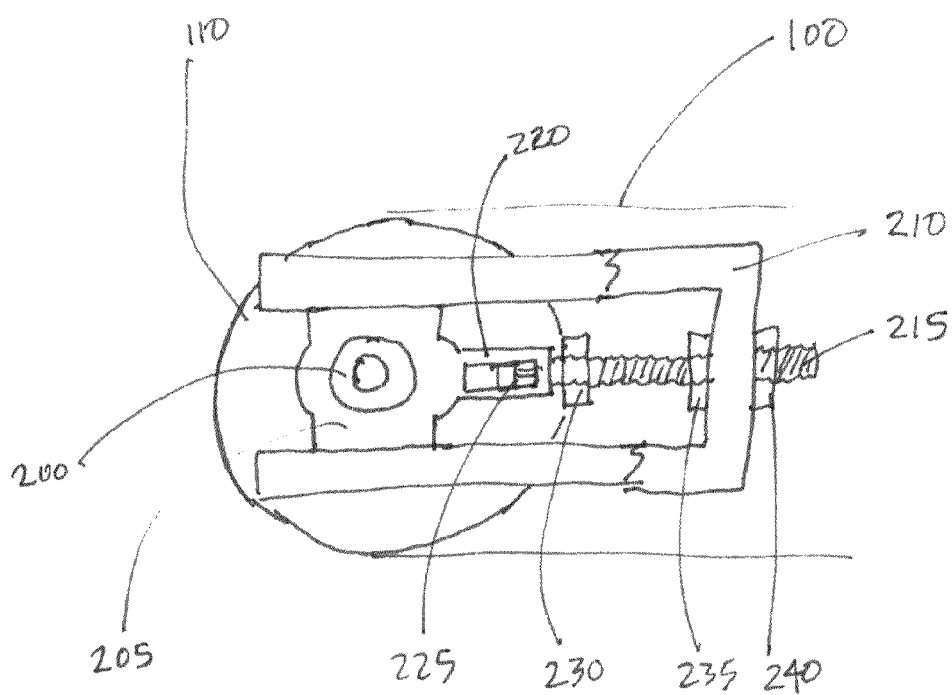
FIG. 2 is a diagram of an exemplary bearing in accordance with an embodiment of the invention.

In summary, the following describes various embodiments of a tension gauge apparatus, and a system and method of measuring conveyor belt tension as set forth herein. FIGS. 1 and 2 provide details on an exemplary conveyor system, which includes an exemplary conveyor belt and bearing that provides tension on the belt. In that context, FIGS. 3A-3B and FIGS. 4A-4D provide diagrams illustrating various views of several examples of an exemplary tension gauge apparatus as it may be in parts, assembled, and applied in conjunction with the exemplary conveyor bearing and belt in accordance with various embodiments of the invention. FIGS. 5A-5B provide details on different exemplary deflecting blades for the apparatus to accommodate different embodiments that require different ranges of belt tension. And, FIG. 6 is a flowchart, which describes steps in an exemplary method of measuring belt tension in accordance with principles of the present invention.

Referring now to FIG. 1, an exemplary conveyor system is illustrated having pulleys 110, 120 and belt 100. In one embodiment, both of the pulleys 110, 120 are stationary relative to each other and a separate take up bearing (not shown) may be used to provide tension on the belt 100 as it moves about pulleys 110, 120 and the take up bearing. In another embodiment, one pulley 110 is stationary while the other pulley 120 may move laterally with respect to the first pulley 110 so as to function as a take-up bearing. A motor (not shown) is typically coupled to one of the pulleys 110, 120 in order to cause at least one of the pulleys to rotate and, as a result, move belt 100 in a continuous loop as it is disposed around the pulleys 110, 120. The pulley coupled to the motor (directly or indirectly) is usually referred to as a drive pulley.

FIG. 2 is a diagram of an exemplary bearing in accordance with an embodiment of the invention. Referring now to FIG. 2, pulley 110 is illustrated disposed about exemplary bearing 200. Bearing 200, as shown, operates as a take-up bearing that can exert a variable tension force against the belt 100. In one embodiment, bearing 200 is mounted within a bearing housing 205 on tracks of a take-up frame 210. Frame 210 is stationary, but bearing housing 205 may move linearly along the tracks of frame 210. To control such movement of bearing 200 relative to the stationary frame 210, bearing housing 205 has a housing extension 220 protruding from the main housing 205 and configured to receive an adjustment screw 215 (also referred to as a tension jack screw or, more generally, a bias rod). On one end, adjustment screw 215 is fixedly attached to frame 210. In one embodiment, the screw 215 may be welded to frame, but in other embodiments the screw 215 may be placed in the fixed position using positioning nuts 235, 240. Positioning nuts 235, 240 may be respectively threaded on adjustment screw 215 such that one nut is on one side of frame 210 while the other nut is tightened on the other side of frame 210 to fix the screw 215 to the frame 210. On the opposing end, adjustment screw 215 provides a stationary structure against which housing extension 220 may be biased. In other words, the linear positioning of housing extension 220 relative to adjustment screw 215 is directly related to the belt tension force being applied to belt 100 by bearing 200.

To keep the bearing's housing 205 and its housing extension 220 in a tensioning position, different configurations of structure may be used to establish different tensioning positions. In a general embodiment, the bearing structure includes a fixed surface that does not move, and a working surface that may be biased or moved relative to the fixed surface in order to linearly articulate and move the bearing relative to the opposing pulley as a way to apply tension force on the belt and establish an appropriate tensioning position of the bearing. In a more specific example, such as the embodiment illustrated in FIG. 2, jam nut 230 may be threaded on adjustment screw 215 to provide a fixed surface that may press against a movable working surface, e.g., the end of housing extension 220 that directly contacts jam nut 230. In another embodiment, a jam nut 230 is not disposed on screw 215. Instead of relying upon the fixed surface of jam nut 230, the end of screw 215 may be biased against bearing housing 205 with a fixed surface implemented by the end of screw 215 itself or a capture nut 225 threaded on that end of screw 215 within the housing extension 220.

Those skilled in the art will realize that the exemplary bearing configuration shown in FIG. 2 is merely one possible conveyor bearing configuration and that other configurations are possible. For example, in another embodiment, the frame 210 for the bearing 200 may extend in a direction opposite from where the belt is running (i.e., as shown in FIG. 2). In other words, instead of the bearing 200 being "pushed" out along the rails of frame 210, the bearing 200 and its housing 205 may be "pulled" towards the screw 215 along the rails of frame 210. What is common to both examples is the existence of a fixed surface relative to the frame 210 (or structure fixedly attached to the frame) and a working surface that may move relative to the fixed surface and that responsively moves the bearing 200 within frame 210.

Figure 3B:
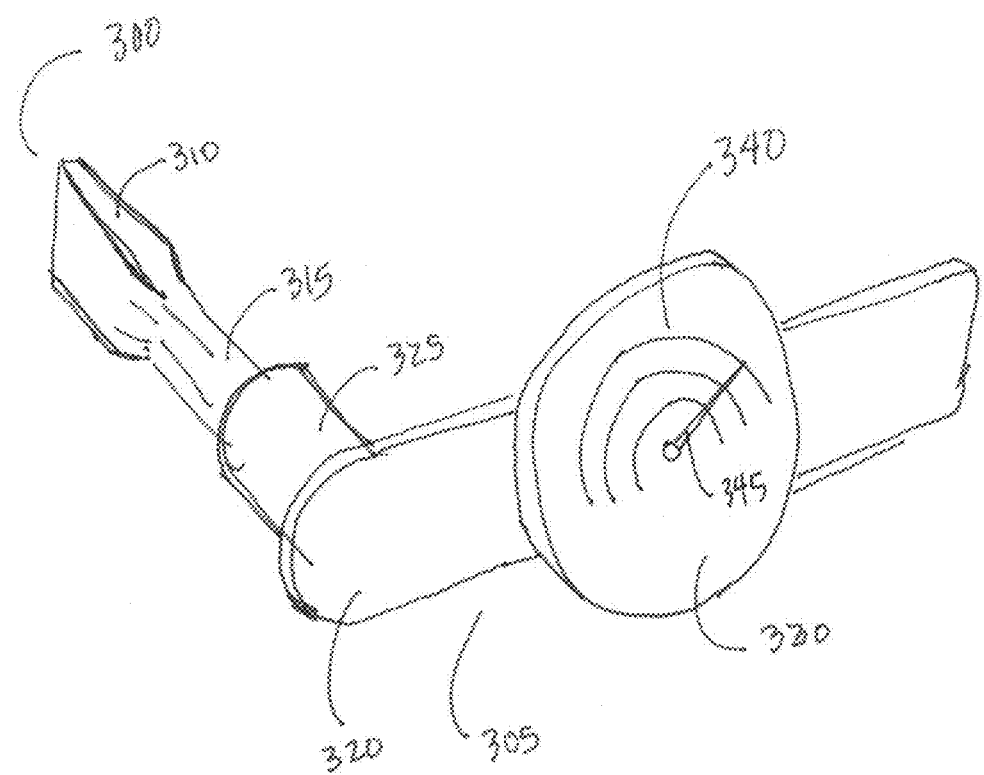
Figure 4B:
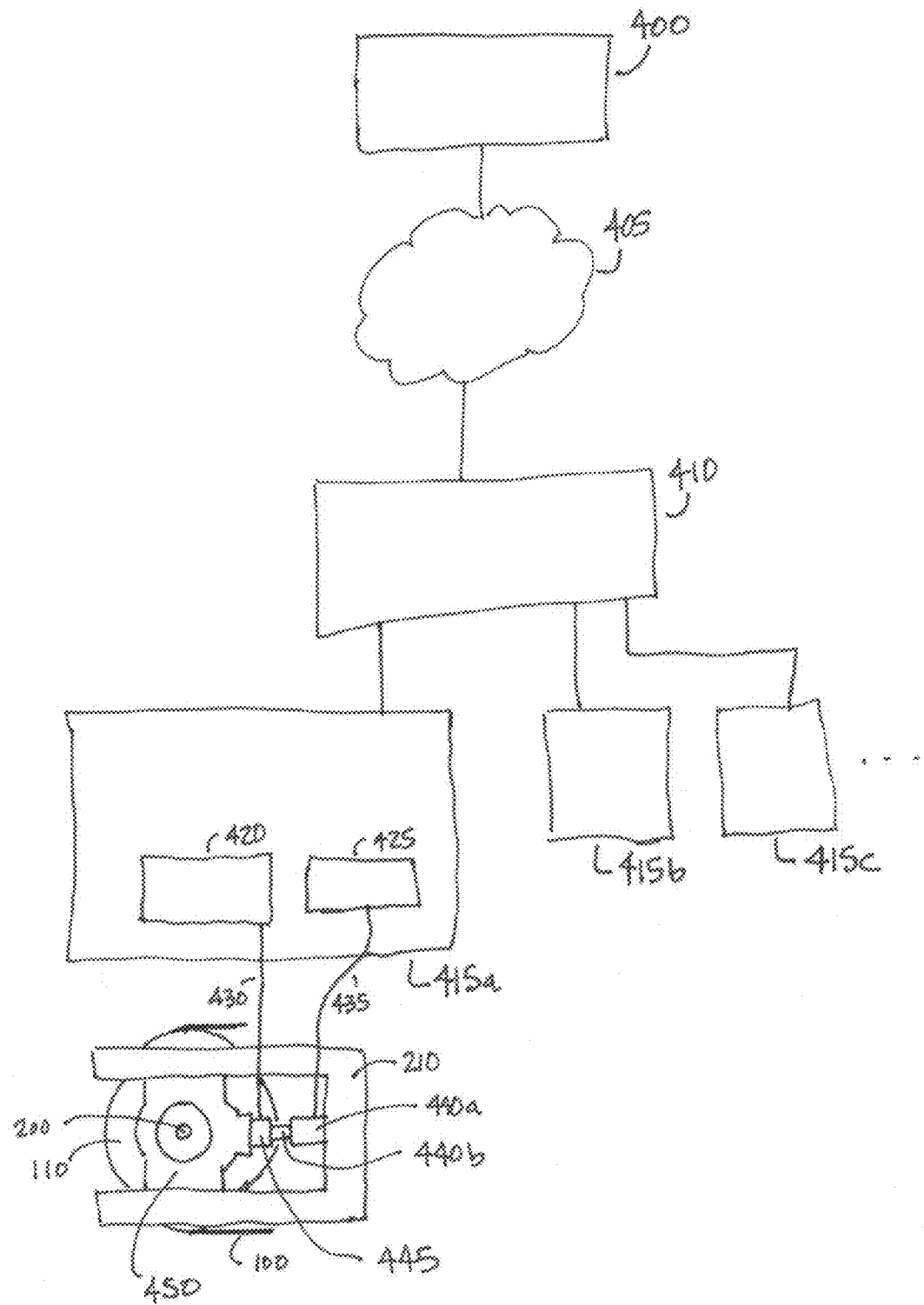
FIG. 4B is a diagram illustrating an exemplary tension measuring apparatus integrated within a conveyor drive in accordance with an embodiment of the invention.
Figure 4C:
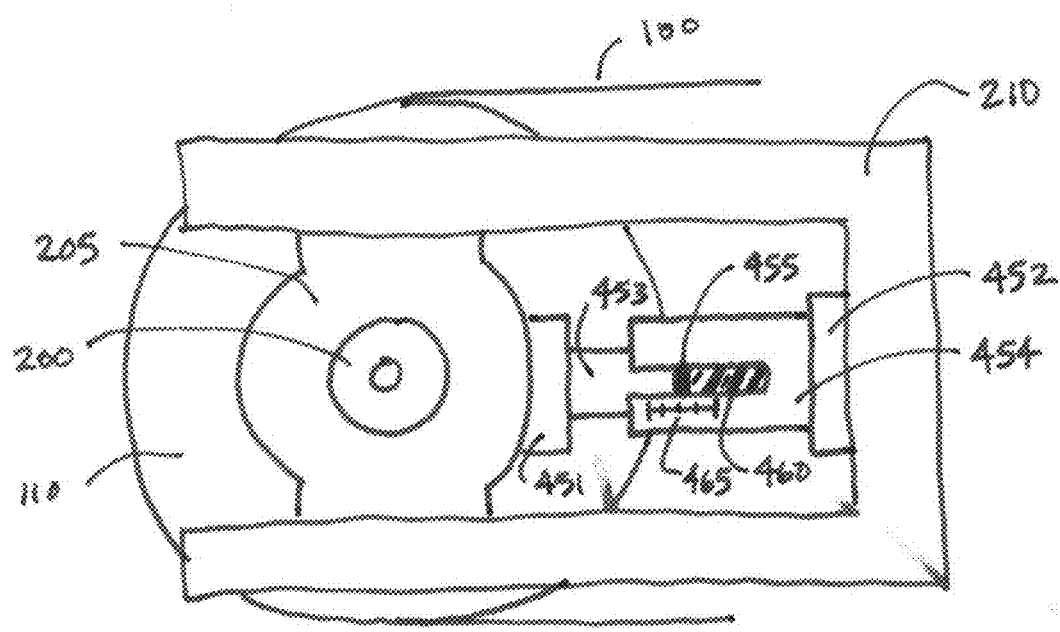
FIG. 4C is a diagram illustrating another exemplary tension measuring apparatus integrated within a conveyor drive in accordance with another embodiment of the invention.

In the context of such an exemplary conveyor system and exemplary bearing shown in FIGS. 1 and 2, FIGS. 3A-3B are diagrams illustrating different views and features of an exemplary tension gauge apparatus for measuring belt tension in accordance with an embodiment of the invention. Referring now to FIG. 3A, the exemplary tension gauge apparatus is generally shown having a bearing interface 300 and a measurement element 305. In broad terms, bearing interface 300 generally provides structure that adapts to fit between a fixed and working surface on the bearing so that force may be applied through the interface to measure the belt tension force currently experienced by the belt. Measurement element 305 generally couples to the bearing interface 300 and provides the force applied by the bearing interface 300 while measuring the applied force at the same time. In one embodiment, the applied force takes the form of a rotational force or torque applied by measurement element 305 taking advantage of a moment arm extending a desired distance from a pivot point on the measurement element 305. Applying an increasing amount of torque via the measurement element 305 allows the bearing interface element to bear substantially all of the tension force being applied to the belt.

In more detail, FIG. 3A shows the bearing interface 300 implemented as a deflecting blade and shows the measurement element 305 implemented as a handle and indicator. While the following description may refer to a bearing interface 300 as a deflecting blade 300, it will be understood that a deflecting blade is merely an example of one type of bearing interface. As noted below in more detail, the described embodiments contemplate the potential of using different types of bearing interfaces while still adhering to principles of the invention.

As shown in FIG. 3A, deflecting blade 300 includes a planar portion 310 and a shaft 315. The shaft 315 extends from a first end of the blade 300 and the planar portion 310 extends from the opposite end of the blade 300. The shaft 315 is disposed in a fixed relationship relative to the planar portion 310. In one embodiment, the planar portion 310 is configured to be placed proximate a working surface associated with a bearing where the working surface is movable to provide the tension force on a conveyor belt. In another embodiment, the planar portion 310 is configured to be placed between a fixed surface and a working surface of bearing 200. In one embodiment, the deflecting blade 300 may be implemented with a hardened steel chisel blade of a desired width and thickness and having shaft 315 configured with a hexagonal cross section to facilitate mating with a socketed handle (or separate socket) and turning about a longitudinal axis 335 of shaft 315.

In the embodiment illustrated in FIG. 3A, exemplary measurement element 305 is implemented with a handle 320, socket 325, and an indicator 330. The socket 325 may be sized to mate with features on shaft 315, such as a hexagonal cross section feature. While socket 325 and handle 320 are illustrated as separate parts in the embodiment shown in FIG. 3A, another embodiment integrates the socket into the handle 320. In this manner, handle 320 may impart a torque to a mated deflecting blade 300 disposed within and coupled to the socket 325. In other words, in one embodiment, the handle 320 is configured to provide a torque relative to the longitudinal axis 335 of shaft 315 and socket 325 when the handle 320 is moved about the longitudinal axis 335, such that as an initial torque is applied to the shaft 315 of blade 300, the planar portion 310 of blade 300 applies a first force against the working surface of the bearing.

Referring now to FIG. 3B, the exemplary tension gauge apparatus shown in FIG. 3A is illustrated in an assembled configuration. As shown in the perspective diagram of FIG. 3B, deflecting blade 300 is coupled to handle 320 by means of a hexagonally cross sectioned shaft 315, which is mated to an appropriately sized socket 325 connected to one end of handle 320 (or, alternatively, mated to a socket integral to the handle). As such, the shaft 315 may be in a removable configuration with handle 320, which facilitates replacement bearing interfaces (such as different sized deflecting blades). In other words, the deflecting blade 300 in one embodiment may be removably attached to the handle 320 such that the deflecting blade 300 can be replaced with an alternative deflecting blade having a different characteristic relative to the deflecting blade 300. Such a different characteristic of the alternative deflecting blade may include a different width, thickness, material, hardness, stiffness, and/or blade shape (e.g., shape of planar portion 310) when compared to the original deflecting blade 320.

In more detail, FIGS. 5A-5B are diagrams illustrating examples of a deflecting blade with different characteristics in accordance with an embodiment of the invention. As shown in FIG. 5A, one blade 500 may have a planar portion having a relatively narrow width while an alternative blade 505 may have a larger width. Those skilled in the art will appreciate how such a different characteristic expands the moment arm for any deflecting force applied by the larger width blade 505, which results in a different mechanical leverage factor compared with other blades. Likewise, as shown in FIG. 5B, one blade 510 may have a thickness that is less than another alternative blade 515, which will also result in a different mechanical leverage factor in that the thicker blade 515 may be able handle larger forces than the thinner blade 510. Those skilled in the art will appreciate that changing the deflecting blade to an alternative one with a different characteristic allows for a different mechanical leverage to be applied to the bearing's working surface, and use of the same handle and indicator with a variety of different deflecting blades to help service a variety of different conveyor systems given the different scales.

To make it easier to place the deflecting blade 300 near or otherwise proximate parts of bearing 200 (and its associated housing 205, frame 210, screw 215, etc.), the planar portion 310 may be formed in a wedge configuration in one embodiment. In particular, the planar portion 310 of one embodiment may have a first planar surface and a second opposing planar surface where these first and second planar surfaces substantially form a planar wedge that can be placed between the fixed surface and the working surface of the conveyor bearing. The planar wedge configuration need not have the first and second planar surfaces being strictly co-planar, but may allow the first and second planar surfaces to have a predetermined planar angle between the two opposing surfaces. Further, different exemplary deflecting blades may have differing planar angles for the desired wedge configuration of each respective blade in order to better accommodate the requirements of a targeted conveyor system. In another embodiment, the edge of the planar portion 310 opposing the shaft 315 may have a pointed configuration to help when inserting the deflecting blade 300 next to a desired location on the structure of the bearing (e.g., between a fixed surface and a movable working surface). In yet another embodiment, planar portion 310 may be implemented with a chisel-like appearance with the first planar surface being substantially co-planar with the longitudinal axis 335 and the second planar surface being at a desired angle relative to the first planar surface. Again, those skilled in the art will appreciate embodiments may include a wide variety of blades to accommodate different bearings and their respective structures within one or more conveyor sections or systems.

Referring back to FIGS. 3A and 3B, indicator 330 is shown coupled to the handle. In one embodiment, the indicator 330 is configured to measure the tension force on the conveyor belt when the handle 320 provides a sufficiently increased torque such that the planar portion 310 minimally deflects the working surface to a desired position. For example, the indicator 330 may record or detect a particular torque applied by handle 320, and the scale may show this detected torque or may be otherwise calibrated to indicate units of force or scaled to indicate that the detected torque represents a particular amount of belt tension force.

As shown in FIG. 3B, indicator 330 has a set of scales 340 disposed about a measurement needle 345. As torque is applied with handle 320 to the deflecting blade 300, the measurement needle 345 moves and specifies a radial location relative to the different radially disposed scales 340. In one embodiment, each of the scales 340 may be associated with a respective one of a set of different deflecting blades. Additionally, each of the scales 340 may correspond to a different mechanical leverage factor associated respectively different deflecting blades. For example, different width deflecting blades use different scales because of their different mechanical leverage factor given the blades provides different levels of force, which act to move the working surface into the desired position.

As will be discussed in more detail below, the desired position of the working surface indicates when substantially all of the tension force on the belt is being applied by the planar portion 310 of deflecting blade 300. In other words, the deflecting blade 300 substantially supports the tension force on the belt when the planar portion 310 of the blade 300 is in the desired position. Stated yet another way, the desired position of the working surface may be when the tension force of the conveyor belt is substantially supported by a deflection force from the planar portion applied to the working surface.

In an embodiment, the operator may turn handle 320 until the working surface is in the desired position. This desired position may be physically indicated in several ways. For example, in one embodiment, the desired position of the working surface may allow for a visible gap between at least part of the planar portion and the fixed surface or the working surface. In another embodiment, the desired position of the working surface may allow a predetermined thickness gauge (e.g., a feeler gauge) to pass between at least a part of the planar portion and the fixed surface or the working surface.

FIG. 4A is a diagram illustrating the exemplary tension gauge apparatus of FIGS. 3A and 3B disposed proximate to an exemplary bearing, such as bearing 200 shown in FIG. 2, in accordance with an embodiment of the invention. Fundamentally, a system for measuring conveyor belt tension may be described with reference to FIG. 4A. While FIG. 4A illustrates only a single bearing upon which an exemplary tension gauge apparatus operates, those skilled in the art will understand and appreciate that the system for measuring conveyor belt tension may comprise a conveyor system with multiple belt sections and multiple conveyor bearings respectively coupled to each of the conveyor belt sections. Thus, while FIG. 4A illustrates an exemplary tension gauge apparatus operating on a single bearing, such as bearing 200, the teachings related to FIG. 4A apply to any of the take-up bearings in the exemplary system for measuring conveyor belt tension and may involve a set of different deflecting blades to accommodate measuring tension with different mechanical leverage at different bearings in the system.

Referring now to FIG. 4A, in one embodiment, the deflecting blade 300 is placed between a fixed surface of the bearing 200 and a working surface of the bearing 200. Generally, in one embodiment, the planar portion 310 of blade 300 is placed between housing extension 220 and jam nut 230. In this example embodiment, jam nut 230 is fixed relative to the stationary frame 210 and, thus, operates as a fixed surface. And the end of housing extension 220 in contact with the other side of blade 300 provides a movable working surface so that deflecting the blade 300 articulates housing extension 220 (and housing 205 and bearing 200 held by housing 205) in a lateral direction along the rails of frame 210.

When the handle provides a sufficiently increased torque to deflect blade 300 such that the planar portion 310 of blade 300 minimally deflects the working surface to a desired position indicative of substantially all of the tension force being applied to the planar portion, a measurement is made via the appropriate one of scales 340. At the desired position, a physical indication is detected, such as a visible gap or the ability to place or remove a measurement or feeler gauge, to show no more torque is needed and that the increased torque applied corresponds to the amount of belt tension force being applied by bearing 200 on belt 100. As noted above, the appropriate one of the scales 340 will correspond to a particular one of the deflecting blades used from the set of different blades.

Generally, a predetermined thickness gauge is merely a material of a known thickness. In one embodiment, such a gauge may be implemented by a feeler gauge or the like that are engineered to help measure a clearance between two parts. Upon accessing the bearing, the gauge (not shown in FIG. 4) may be installed between the end of screw 215 and bearing 205 so there is a slight drag when the gauge is pushed back and forth. In this exemplary embodiment, the end of screw 215 should be in contact and rest upon the gauge. To place the planar portion 310 of deflecting blade 300 in position to assist with measuring belt tension, jam nut 230 may be loosened until a gap between the jam nut and bearing housing 220. This effectively places the blade 300 proximate a fixed surface (e.g., the surface of jam nut 230 proximate the planar portion 310 of blade 300) and a working surface of the bearing such that when a sufficiently increased amount of torque is applied by handle 320, the blade 300 minimally deflects the working surface to the desired position. In that desired position, substantially all of the belt tension of the conveyor belt is associated with applied torque that achieves the minimal deflection. The desired position may be physically indicated or detected, in this embodiment, when the gauge may be removed to overcome the slight amount of drag or when the drag has noticeably reduced (e.g., when the gauge no longer has any drag as it is moved between the parts). In other words, the desired position of the working surface allows for passing a predetermined thickness gauge between at least a part of the planar portion and the fixed surface or the working surface. The indicated measurement on scales 340 (appropriate for the particular blade 300 used) may then be recorded as a measure of belt tension.

In an example where there is no jam nut next to the bearing, other structure may be used to provide an appropriate working surface and fixed surface so that the assembled tension gauge apparatus may be connected to measure belt tension. For example, such other structure may include one or more twist-on quick release nuts. In one embodiment, an appropriate sized twist-on quick threading set of locknuts may be installed on screw 215. The planar portion 310 of deflecting blade 300 may be placed in position to assist with measuring belt tension by disposing the blade 300 between one side of the quick release nuts (not shown in FIG. 4) and bearing housing 220. This effectively places the blade 300 proximate a fixed surface (e.g., the surface of the quick release nuts proximate the planar portion 310 of blade 300) and a working surface of the bearing such that when a sufficiently increased amount of torque is applied by handle 320, the blade 300 minimally deflects the working surface (and as a result, the bearing 200) to a desired position. In that desired position, substantially all of the belt tension of the conveyor belt is associated with the applied torque that achieves the minimal deflection. The desired position may be physically detected when a visible gap appears between at least part of the planar portion and the fixed or working surface. In some embodiments, a backlight may be used to help detect the visible gap. And the indicated measurement on scales 340 (appropriate for the particular blade 300 used) may then be recorded as a measure of belt tension.

Other embodiments of such a system and apparatus for measuring belt tension may include additional features. For example, another embodiment may translate the motion of the handle 320 into a separating or prying action of an alternative type of bearing interface 300 (e.g., such as a screw jack that spreads the planar surfaces of the planar portion in response to handle motion). Similarly, another embodiment may use yet another alternative type of bearing interface 300 that brings together the fixed and working surfaces with a pinching or clamping action (e.g., such as a screw jack that clamps onto extruding points on the fixed and working surfaces, and brings the two surfaces together sufficiently as the handle is moved or articulated).

Those skilled in the art will appreciate that the principles of the present invention apply to various configurations of take-up bearings, housings, frames, as well as different fixed and working surfaces. For example, one embodiment may have built-in fixed and working surfaces that extend out and away from the bearing structure so as to help facilitate a standardized feature on a take-up bearing and conveyor system to assist with tensioning. As such, the embodiment may not need to loosen or separately install parts or structure on the bearing when making a belt tension measurement. In another embodiment, the extended fixed and working surfaces may be separate parts that may attach to existing parts of the bearing's housing or frame outside. The extended fixed and working surfaces may also be integrally formed as part of the bearing's housing and/or frame, which may help speed belt tension measurement operations.

Yet another embodiment may incorporate an exemplary tension measuring fixture or element within the construction of an exemplary conveyor drive frame. FIG. 4B illustrates a sample of such a tension measuring system incorporated within the construction of a conveyor drive in accordance with an embodiment of the invention. Generally, this type of embodiment may allow for a greater incorporation of automated belt tension measurements within a conveyor system in order to facilitate more advantageous ways and methods of initially configuring, re-configuring, monitoring, and diagnosing of the conveyor system. Other implementations of such an embodiment may include automated belt re-tensioning within a conveyor system.

Referring now to FIG. 4B, an exemplary drive frame (such as frame 210) may be configured with bearing 200 and remotely adjustable housing 450. Generally, housing 450 moves along the rails of frame 210 (similar to housing 205), but does so with actuators and sensors that may be remotely controlled and monitored, respectively. As part of such an embodiment, one or more processing-based computing devices may be used to interact with the remotely controlled and monitored structure associated with bearing 200. In one example, a tension controller (such as 415a) may be used as such a processing-based computing device. In more elaborate and complex examples, a hierarchy of controllers (such as 415a, 415b, 415c, 410, and 400) may be desired when monitoring and measuring belt tension in systems with one or more conveyor sections.

As used herein, a processing-based computing device, such as controller 415a, is generally a hardwired or an otherwise programmable electronic module that is configured to monitor a sensor or drive an actuator or both. While not shown in detail in FIG. 4B, those skilled in the art will appreciate that an embodiment of such a processing unit may comprise a processor (more generally a processing unit, but more specifically may be implemented with microprocessors, microcontrollers, computers, servers, and the like), a data communication interface/network interface, memory storage and volatile memory. In general, the processing unit performs basic and/or complex computations and may execute operational and application program code and other program modules within the device to implement a desired functionality (e.g., to monitor a sensor or strain gauge; to actuate an adjusting screw or piston; etc.). Data communication interface/network interface is generally any type of communication interface operatively capable of coupling the processing unit to equipment (e.g., a sensor or actuator) and to other computing devices (e.g., controllers 410 and 400) through communication paths. For example, top level controller 400 may be coupled and connect to conveyor system controller 405 through a network 405. Likewise, conveyor system controller 405 may be coupled and connect to conveyor bearing controller 415a via a separate communication path. But those skilled in the art will appreciate implementations where a single network may ubiquitously connect disparate control elements and equipment without relying upon separate physical communication paths.

The processing unit of the device, such as conveyor bearing controller 415a, may be further coupled to on-board volatile memory and non-volatile memory storage (both of which are examples of a non-transitory computer readable storage medium). Both memory components provide storage elements used by a processing unit for maintaining and storing information and data used when measuring belt tension and/or adjusting the bearing.

As illustrated in FIG. 4B, top level controller 400 is coupled through network 405 to conveyor system controller 405. Top level controller 400 may operate as a high-level manufacturing control system or distribution control system for a particular building or operating group of conveyor systems. Conveyor system controller 405 may receive instructions from and provide feedback to top level controller 400 as part of running the group of conveyor systems. Likewise, conveyor system controller 405 may be coupled to one or more conveyor bearing controllers (e.g., controllers 415a, 415b, 415c). As such, one or more of these controllers may monitor belt tension within a particular conveyor belt section of a system and/or adjust parameters to change the belt tension to a desired setting that helps optimize operating conditions and belt service life.

For example, controller 415a may monitor an electronic strain gauge 445 connected to a working surface of housing 450 and a fixed surface of an actuator 440a, 440b attached to frame 210. In one embodiment, the actuator may be implemented with a piston-style actuator having a fixed outer sleeve 440a and an inner movable rod 440b responsive to changes in hydraulic fluid. Those skilled in the art will appreciate that other embodiments may use different actuating structures depending on the level of tension and forces need to articulate particular housing 450 and desired belt tension. Examples of such actuators include but are not limited to, a screw or geared device, air pistons, rotating chain drives or drum, or other electronically controllable elements or drives that linearly move a target member (e.g., bearing housing 450 and its associated bearing 200).

As belt 100 accumulates wear, belt tension on belt 100 may reduce. Controller 415a stores an initial measurement of tension force when the belt initially installed. As the belt tension decreases, controller 415a may sense or otherwise identify a reduction in the belt tension through strain gauge 445, which is then recorded and stored. Controller 415a may analyze the recorded strain gauge tension reading to determine if a threshold reduction in belt tension has been reached. In this manner, the controller 415a identifies a change of interest in the tension force. If so, controller 415a may issue an alarm or notification, which may allow for efficient addressing of belt tension issues. Such a notification or alarm may go to a third party (machine or human) via wired or wireless signals, sound, visual indication, or display on a user interface associated with one or more of the controllers. The adjustable linear force being applied by the actuator 440a, 440b may then be altered via an adjustment signal sent from controller 415a, which causes an automated tensioning effect and may reduce conveyor system downtime. In one example, the adjustment may simply change the linear force being applied to a different force, while in other examples the alteration made in response to the adjustment signal may involve halting a conveyor system to prevent further or potential damage. Other examples may involve changing the speed of the conveyor system or engaging separate tensioning apparatus (such as a second take-up bearing) to apply further tension beyond that possible with just one take-up bearing.

In one embodiment, controller 415a may compare the recorded tension reading to other readings in different parts of the conveyor system to help diagnose problems. In another example, controller 415a may assess the recorded tension reading and analyze the reading over a sequence of recorded readings over time to further help diagnose potential problems. In one embodiment, potential issues are identified as possible causes of non-ideal tension measurements based upon a measurement profile (e.g., range of readings for tension at one or more conveyor bearings) and may be sent to other controllers (e.g., controller 410 or 400) so that a third party (machine or human) can intervene. As such, such a system may be used to measure and monitor belt tension, and intelligently react accordingly.

In another embodiment where an actuator is used, controller 415a may control the linear actuation of housing 450 during an initial configuration or re-configuration of a conveyor bearing. In more detail, an embodiment may use a belt tension measure as described above and may take the additional step of adjusting the bearing to achieve a desired belt tension measurement. This may be done in an iterative manner in some instances, while other instances may opt to use pre-staged settings to quickly and easily adjust for different known configurations (e.g., a "running" configuration and a "maintenance" configuration). For example, controller 415a may send an alternative configuration signal to actuator 440a, 440b that allows for maintenance personnel operating controller 415a to easily and quickly move the conveyor into a maintenance configuration. Other embodiments may allow for altering the belt tension to an alternative tension level based on differing parameters (e.g., product weight and density, conveyor length, etc.). With the ability to remotely monitor belt tension via controller 415a and path 430 to strain gauge 445 and remotely alter the belt tension via controller 415a and path 435 to actuator 440a, 440b, the conveyor system implementing such aspects allows for more intelligent operation to help optimize maintenance issues with self-diagnosing tasks and maximizing belt usage.

While the embodiments described with reference to FIG. 4B involve controllers (e.g., controllers 415a, 415b, 415c, 410, and 400), other embodiments using integrated tension gauge devices may involve less automation and complexity while still being advantageously integrated within an exemplary conveyor system. For example, FIG. 4C illustrates another example of an exemplary tension measuring system integrated into a conveyor drive in accordance with an embodiment of the invention. Referring now to FIG. 4C, conveyor housing 205 is similarly disposed along rails of frame 210, but the tension measuring system includes a spring/scale type of apparatus that provides belt tension while also indicating a measured belt tension. More specifically, as shown in FIG. 4C, housing 205 provides a base structure 451 that is opposed by a base structure 452 on frame 210. The exemplary tension measuring device shown in this illustrated embodiment essentially comprises an inner plunger element 453, a spring 460, and an outer sleeve element 454. Inner plunger element 453 is mounted to a base structure 451 of housing 205, while the outer sleeve element 454 is mounted to a base structure 452 of frame 210. The inner plunger element 453 has a separate plunger face 455 disposed at the end of it opposite base structure 451. In this manner, inner plunger element 453 may provide a uniform mating structure to receive the spring 460 and transmit forces from the spring 460 to the plunger 453 (and from the plunger to the belt). Additionally, the relative position of plunger face 455 is externally visible such that it may operate as an indicator of force relative to a scale 465 disposed along outer sleeve 452. Scale 465 is typically calibrated and associated with a particular spring 460 when scale 465 is implemented as a single scale range. However, other embodiments of scale 465 may be implemented with more than one scale range, with each scale range being associated with a different spring to use as spring 460. Thus, in this particular integrated belt tension measurement embodiment, a tensioning force may be applied to belt 100 via spring 460 and its relative compression within the outer sleeve 452. The relative position of the plunger face 455 on scale 465 (or relative to an appropriate one of in a set of scale ranges used as scale 465) provides a useful, quick, and externally visible indication of belt tension integrated within the conveyor system.

Figure 4D:
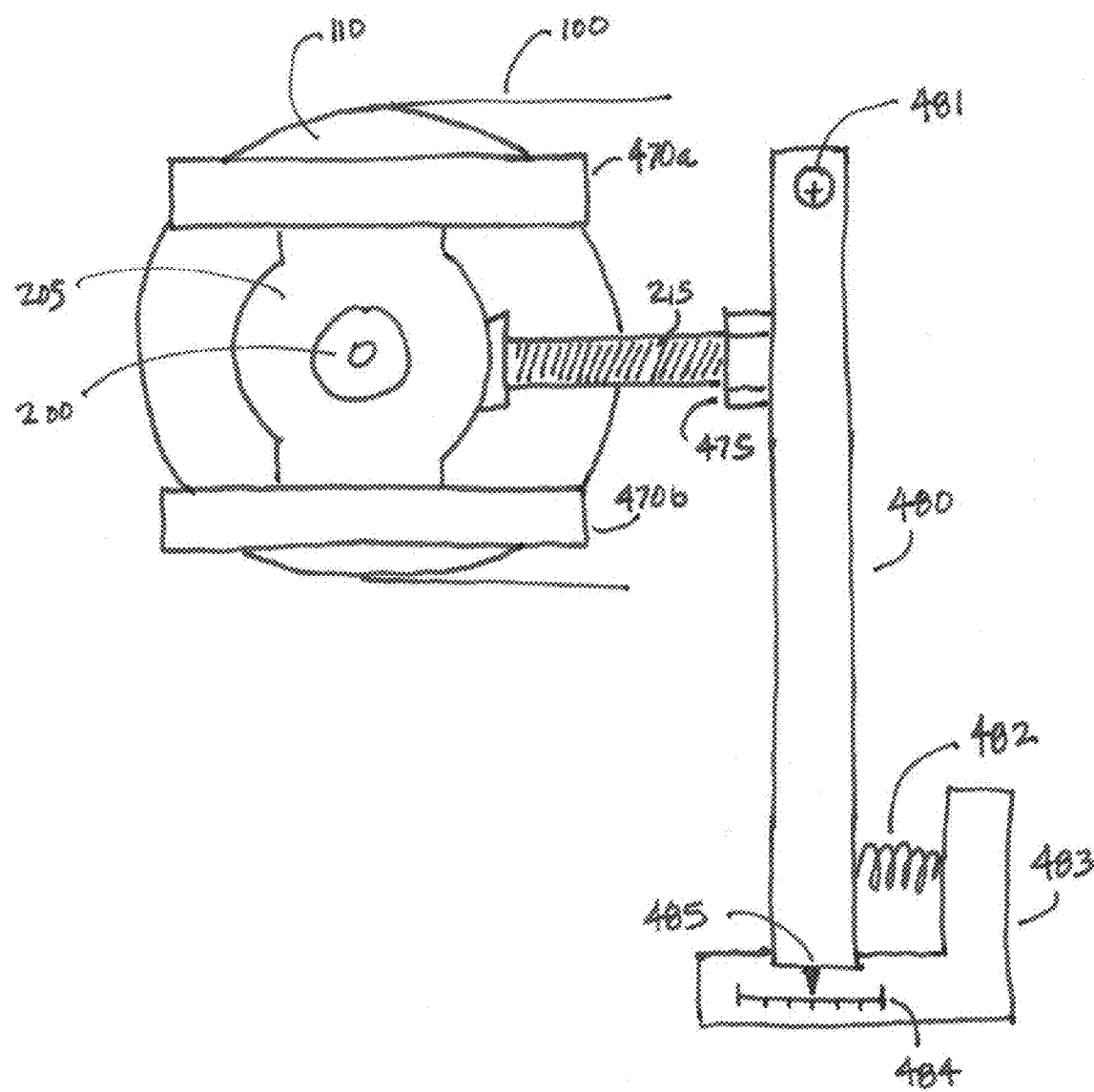
FIG. 4D is a diagram illustrating a third type of exemplary tension measuring integrated within a conveyor drive in accordance with yet another embodiment of the invention.
Figure 5A:
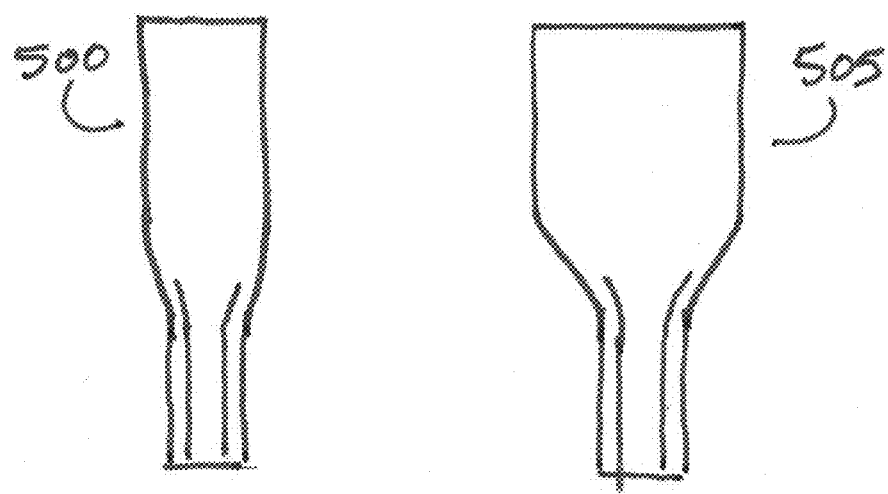
FIGS. 5A-5B are diagrams illustrating examples of a deflecting blade with different characteristics in accordance with an embodiment of the invention.
Figure 5B:
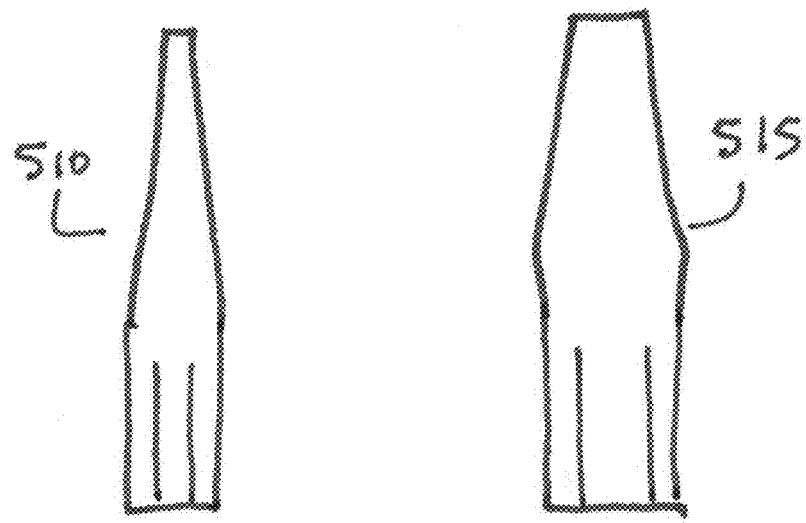

FIG. 4D illustrates yet another sample of an exemplary tension measuring system incorporated within the construction of a conveyor drive in accordance with an embodiment of the invention. In FIG. 4D, frame 210 for bearing housing 205 may be implemented with separate pieces rather than a unitary frame structure. For example, as shown in FIG. 4D, horizontal rails 470a, 470b are parts of a frame disposed in a stationary manner within the conveyor system to allow for horizontal movement and articulation of bearing housing 205. Threaded screw 215 is disposed as being coupled to housing 205 and having nut 475 on the end of screw 215 opposite housing 205. In this embodiment, nut 475 abuts against hinged linkage 480, which may pivot about a pivot point 481. Hinged linkage 480 has a predetermined length such that a force applied to linkage 480 at a particular distance away from the pivot point 481 (i.e., a moment arm about the pivot point) operates as a moment force. For example, at a predetermined distance away from the pivot point 481 of linkage 480, a tensioning member, such as spring 482, may be applied such that a tension force is applied to nut 475 (and transmitted to bearing housing 205 and bearing 200 and, ultimately, belt 100). Spring 482 is anchored on one end to a stationary part 483 of the conveyor system, while the other part at least presses against linkage 480. At or near the end of linkage 480, a pointer 485 is disposed to provide an indication relative to one or more scales 484. Those skilled in the art will appreciate that a tensioning member is structure that compresses under load. While the illustrated example uses a spring, other examples of a tensioning device or member may include, but are not limited to, a compressible cushion, an adjustable piston/plunger type of device, or other device that compresses under a load in a predictable manner.

In the embodiment of FIG. 4D, scales 484 may include one or more scales where each scale is associated with a different spring having a different compression characteristic. In this manner, inner plunger element 453 may provide a uniform mating structure to receive the spring 460 and transmit forces from the spring to the plunger 453. Thus, in the integrated measurement embodiment shown in FIG. 4D, a tensioning force may be applied to belt 100 via spring 482 at the moment arm and its relative compression as indicated by the pointer 485 on scale 484 (or relative to an appropriate one of in a set of scales (not shown) used as scale 484) to provide a useful, quick, and externally visible indication of belt tension integrated within the conveyor system.

Further details on the operation of a particular embodiment is illustrated through a general flowchart of FIG. 6. In particular, FIG. 6 is a flowchart diagram illustrating exemplary steps of a method for measuring belt tension on a conveyor belt in accordance with an embodiment of the invention. Method 600 begins at stage 605 by accessing a working surface of a conveyor bearing. This may involve placing the working surface relative to the conveyor bearing to provide a temporary bias point from which to externally measure belt tension of the conveyor belt.

A planar portion of a deflecting blade is placed directly proximate the working surface at stage 610. In some embodiments, the blade may be placed near and in communication with the working surface while not being directly proximate or in actual contact with the working surface.

At stage 615, the method 600 continues by applying a torque relative to a longitudinal axis of the deflecting blade such that the deflecting blade provides an initial force against the working surface. For example, as shown in FIG. 4, handle 320 may be radially moved about the axis of blade 300 to impart a torque, which provides the initial force against a working surface (e.g., the surface of housing extension 220 in contact with the planar portion 310 of blade 300).

At stage 620, method 600 applies a sufficiently increased torque relative to the longitudinal axis of the deflecting blade such that the blade minimally deflects the working surface to a desired position. This desired position represents or is indicative of when substantially all of the belt tension on the conveyor belt is being applied by the deflecting blade. As explained above, different embodiments may detect this desired position in various ways. For example, the desired position of the working surface may allow for a visible gap to be seen between at least part of the planar portion and the fixed surface or the working surface, and an embodiment may visually detect this gap to indicate the desired position. In another embodiment, the desired position of the working surface allows for passing a predetermined thickness gauge, such as a feeler gauge, between at least a part of the planar portion and the fixed surface or the working surface. Thus, that embodiment may detect passage of the gauge between at least a part of the planar portion and either the fixed surface or the working surface.

Furthermore, an embodiment may also include measuring the belt tension on the conveyor with a predetermined one of a plurality of scales on an indicator. The scales are associated with the deflecting blade when the blade applies torque and, at some point, minimally deflects the working surface to the desired position. Such a measurement may further involve recording a torque value relative to a particular one of the scales associated with the deflecting blade being used, where the recorded value is associated with the desired position and the current belt tension on the conveyor belt. In another embodiment, the recording step may involve recording the belt tension measurement when the desired position of the working surface allows for a visible gap between at least part of the blade portion and the working surface. In yet another embodiment, the recording step may involve recording the belt tension measurement when the desired position of the working surface allows for passing a predetermined thickness gauge between at least a part of the blade and working surface.

Other embodiments may focus on what may be done with such belt tension measurements within a conveyor system. For example, one embodiment may also record the belt tension measurement as an initial belt tension, record a second decreased torque after a predetermined period (such as a break-in period), and then re-measure the belt tension as a second belt tension. More specifically, the embodiment may, after a predetermined period, applying a second increased torque relative to the longitudinal axis of the deflecting blade such that the blade minimally deflects the working surface to the desired position indicative of substantially all of the belt tension on the conveyor belt after the predetermined period. The embodiment may then re-measure the belt tension on the conveyor with the predetermined scale as a second belt tension, and determine if there may be a service issue related to the conveyor based upon a level of tension drop after the predetermined period, where the tension drop is associated with a change between the initial belt tension and the second belt tension. Adjustments may be automatically or manually made to the belt tension, as well as automated monitoring of belt tension measurements.

Another embodiment may use such belt tension measurements on different sides of the same conveyor system or conveyor belt section to identify a potential service issue or quickly and efficiently troubleshoot such a conveyor system or section. For example, this other embodiment may also record the belt tension measurement as an initial belt tension on a first side of the conveyor, measure belt tension on a second side of the conveyer by repeating the steps noted in FIG. 6 on a second side of the conveyor, and determining if there is an imbalance of belt tension on the conveyor belt based upon the measured belt tension on the first side of the conveyor and the measured belt tension on the second side of the conveyor.

It should be emphasized that the sequence of operations to measure belt tension described herein (such as those set forth above with respect to FIG. 6) is merely an example, and that a variety of sequences of operations to measure belt tension may be followed while still being true and in accordance with the principles of the present invention.

At least some portions of exemplary embodiments outlined above may be used in association with portions of other exemplary embodiments. Moreover, at least some of the exemplary embodiments disclosed herein may be used independently from one another and/or in combination with one another and may have applications to devices and methods not disclosed herein.

Those skilled in the art will appreciate that embodiments may provide one or more advantages depending upon the particular embodiment. It will be apparent to those skilled in the art that various modifications and variations can be made to the structures and methodologies described herein. Thus, it should be understood that the invention is not limited to the subject matter discussed in the description. Rather, the present invention is intended to cover modifications and variations and the disclosed embodiments are merely examples that implement aspects or various principles of the present invention.

What is claimed is:
1. A tension gauge apparatus for measuring belt tension on a conveyor bearing providing a tension force on a conveyor belt, the conveyor bearing having a fixed surface and a working surface, comprising:
   a deflecting blade having
      a planar portion configured to be placed between the fixed surface and the working surface of the conveyor bearing, and
      a shaft disposed in a fixed relationship relative to the planar portion;
   a handle connected to the shaft, the handle being configured to provide a torque relative to an axis of the shaft when the handle is moved about the axis of the shaft, such that as an initial torque is applied to the shaft, the planar portion applies a first force against the working surface; and
   an indicator coupled to the handle and configured to measure the tension force on the conveyor belt when the handle provides a sufficiently increased torque such that the planar portion minimally deflects the working sur- face to a desired position indicative of substantially all of the tension force being applied to the planar portion.

2. The tension gauge apparatus of claim 1, wherein the planar portion further comprises a first planar surface and a second opposing planar surface, the first surface and the second opposing surface substantially forming a planar wedge configured to be placed between the fixed surface and the working surface of the conveyor bearing.

3. The tension gauge apparatus of claim 1, wherein the shaft is in a removable configuration with the handle.

4. The tension gauge apparatus of claim 3, wherein the deflecting blade is removably attached to the handle such that the deflecting blade can be replaced with an alternative deflecting blade having a different characteristic relative to the deflecting blade.

5. The tension gauge apparatus of claim 4, wherein the different characteristic of the alternative deflecting blade is at least one from a group comprising width, thickness, material, hardness, stiffness, and blade shape.

6. The tension gauge apparatus of claim 1, wherein the desired position of the working surface is when the tension force of the conveyor belt is substantially supported by a deflection force on the working surface from the planar portion.

7. The tension gauge apparatus of claim 6, wherein the desired position of the working surface allows for a visible gap between at least part of the planar portion and the fixed surface or the working surface.

8. The tension gauge apparatus of claim 6, wherein the desired position of the working surface allows for passing a predetermined thickness gauge between at least a part of the planar portion and the fixed surface or the working surface.

9. The tension gauge apparatus of claim 1, wherein the indicator further comprises a plurality of scales corresponding to a plurality of different deflecting blades.

10. The tension gauge apparatus of claim 9, wherein each of the plurality of scales corresponds to a different mechanical leverage factor associated with a respective one of the different deflecting blades.

11. A system for measuring conveyor belt tension, comprising:
   a conveyor system having a plurality of conveyor belt sections, each of the conveyor belt sections including a conveyor belt;
   a plurality of conveyor bearings respectively coupled to each of the conveyor belt sections, each of the conveyor bearings having a fixed surface and a working surface, each of the conveyor bearings providing a tension force on the conveyor belt;
   a deflecting blade having
      a planar portion configured to be placed between the fixed surface and the working surface of at least one of the conveyor bearings, and
      a shaft in a fixed relationship relative to the planar portion;
   a handle connected to the shaft, the handle being configured to provide a torque relative to an axis of the shaft when the handle is moved about the axis of the shaft, such that as an initial torque is applied to the shaft, the planar portion applies a first force against the working surface of the eat least one of the conveyor bearings; and
   an indicator coupled to the handle and configured to measure the tension force on the conveyor belt when the handle provides a sufficiently increased torque such that the planar portion minimally deflects the working surface to a desired position indicative of substantially all of the tension force being applied to the planar portion.

12. The system for measuring conveyor belt tension of claim 11, wherein the deflecting blade is removably attached to the handle such that the deflecting blade can be replaced with an alternative deflecting blade having a different characteristic relative to the deflecting blade.

13. The system for measuring conveyor belt tension of claim 12, wherein the different characteristic of the alternative deflecting blade is at least one from a group comprising width, thickness, material, hardness, stiffness, and blade shape.

14. The system for measuring conveyor belt tension of claim 12, wherein the indicator further comprises a plurality of scales, a first of the plurality of scales associated with the deflecting blade and a second of the plurality of scales associated with the alternative deflecting blade.

15. A tension gauge apparatus for measuring belt tension on a bearing providing a tension force on a belt, comprising:
   a deflecting blade having a shaft extending from a first end of the blade and a planar portion extending from the opposite end of the blade, the planar portion configured to be placed proximate a working surface associated with the bearing, the working surface being movable to provide the tension force on the belt;
   a handle connected to the shaft, the handle being configured to provide a torque relative to a longitudinal axis of the shaft when the handle is moved about the longitudinal axis of the shaft, such that as an initial torque is applied to the shaft, the planar portion applies a first force against the working surface; and
   an indicator provided on the handle and configured to measure the tension force on the belt when the handle provides a sufficiently increased torque such that the planar portion minimally deflects the working surface to a predetermined position.

16. The tension gauge apparatus of claim 15, wherein the working surface is removable relative to the bearing and configured to be placed on the bearing to provide a temporary bias point from which to externally measure belt tension.

17. The tension gauge apparatus of claim 15, wherein the planar portion further comprises a first planar surface and a second opposing planar surface, the first planar surface and the second opposing planar surface substantially forming a planar wedge configured to be placed proximate the working surface of the bearing.

18. A method for measuring belt tension on a conveyor belt, comprising:
   a. accessing a working surface of a conveyor bearing;
   b. placing a planar portion of a deflecting blade proximate the working surface;
   c. applying a torque relative to a longitudinal axis of the deflecting blade such that the deflecting blade provides an initial force against the working surface; and
   d. applying a sufficiently increased torque relative to the longitudinal axis of the deflecting blade such that the blade minimally deflects the working surface to a desired position indicative of substantially all of the belt tension on the conveyor belt being applied by the deflecting blade.

19. The method of claim 18, wherein the step of accessing the working surface further comprises placing the working surface relative to the conveyor bearing to provide a temporary bias point from which to externally measure belt tension of the conveyor belt.

20. The method of claim 18 further comprising the step of measuring the belt tension on the conveyor with a predetermined one of a plurality of scales on an indicator associated with the deflecting blade when the blade minimally deflects the working surface to the desired position.

21. The method of claim 20 further comprising the step of recording the belt tension measurement when the desired position of the working surface allows for a visible gap between at least part of the blade portion and the working surface.

22. The method of claim 20 further comprising the step of recording the belt tension measurement when the desired position of the working surface allows for passing a predetermined thickness gauge between at least a part of the blade and working surface.

23. The method of claim 20, further comprising the steps of:
recording the belt tension measurement as an initial belt tension;
after a predetermined period, applying a second increased torque relative to the longitudinal axis of the deflecting blade such that the blade minimally deflects the working surface to the desired position indicative of substantially all of the belt tension on the conveyor belt after the predetermined period;
re-measuring the belt tension on the conveyor with the predetermined one of the plurality of scales as a second belt tension; and
determining if there is a service issue related to the conveyor based upon a level of tension drop after the predetermined period associated with a change between the initial belt tension and the second belt tension.

24. The method of claim 20 further comprising the steps of:
recording the belt tension measurement as an initial belt tension on a first side of the conveyor;
measuring belt tension on a second side of the conveyer by repeating steps (a)-(d) on a second side of the conveyor; and
determining if there is an imbalance of belt tension on the conveyor belt based upon the measured belt tension on the first side of the conveyor and the measured belt tension on the second side of the conveyor.

25. A system for measuring conveyor belt tension, comprising:
a frame;
a bearing housing movably mounted within the frame;
a conveyor bearing rotationally mounted within the bearing housing, the conveyor bearing providing a tension force on a conveyor belt;
an integrated tension measuring device disposed between the frame and the bearing housing, the integrated tension measuring device providing a reading on an output, the reading being associated with the tension force provided by the conveyor bearing;
an actuator disposed between the integrated tension measuring device disposed between the frame and the bearing housing, the actuator providing an adjustable linear force on the conveyor bearing through the bearing housing; and a controller coupled to the integrated tension measuring device and the actuator, the controller being operatively configured to:
store an initial measure of the tension force based upon an initial reading from the integrated tension measuring device,
identify a change in the tension force on the conveyor belt based upon a subsequent reading from the integrated tension measuring device,
if the subsequent reading is greater than a predetermined threshold, issue a notification indicating the subsequent reading exceeded the predetermined threshold, and
alter the adjustable linear force on the conveyor bearing by sending an adjustment signal to the actuator, which causes the actuator to move relative to the bearing housing.

26. The system of claim 25, wherein the controller is further operatively configured to compare the subsequent reading to a history of readings associated with one or more other conveyor bearings.

27. The system of claim 25, wherein the controller is further operative to alter the adjustable linear force on the conveyor bearing in response to an alternative configuration signal sent to the actuator.

28. A system for measuring conveyor belt tension, comprising:
a set of frame rails;
a bearing housing movably mounted on the set of frame rails;
a conveyor bearing rotationally mounted within the bearing housing, the conveyor bearing providing a tension force on a conveyor belt;
a pivoting linkage having a first end and a second end, the linking having a pivot point disposed substantially near the first end, wherein the pivot point is stationary with respect to the set of frame rails, the pivoting linkage in a responsive configuration with the bearing housing to cause the bearing housing to move on the set of rails when the pivoting linkage is pivoted about the pivot point;
a tensioning member disposed substantially near the another end of the pivoting linkage, the tensioning member providing a torque on the pivoting linkage associated with a compression force on the tensioning member; and
an indicator disposed substantially near the another end of the pivoting linkage, the indicator configured to measure the tension force on the conveyor belt when the tensioning member provides a sufficiently increased torque to the pivoting linkage at the another end of the pivoting linkage.

29. The system of claim 28, wherein the indicator further comprises a plurality of scales, a first of the plurality of scales associated with the tensioning member and a second of the plurality of scales associated with an alternative tensioning member having a different compression characteristic.

* * * * *